United States Patent [19]

Raquet

[11] 4,137,760
[45] Feb. 6, 1979

[54] MEASURING WHEEL

[75] Inventor: Erwin Raquet, Witten, Fed. Rep. of Germany

[73] Assignee: Fried. Krupp Hüttenwerke AG, Bochum, Fed. Rep. of Germany

[21] Appl. No.: 843,536

[22] Filed: Oct. 19, 1977

[30] Foreign Application Priority Data

Oct. 21, 1976 [DE] Fed. Rep. of Germany ....... 2647505
Feb. 15, 1977 [DE] Fed. Rep. of Germany ....... 2706240

[51] Int. Cl.² ............................ G01L 1/22; G01B 7/18
[52] U.S. Cl. ..................................................... 73/146
[58] Field of Search ........................... 73/146, 88.5 R; 177/132, 136, 163, 211

[56] References Cited

U.S. PATENT DOCUMENTS 3,422,671  1/1969  Elengo, Jr. ..................... 177/211 X

FOREIGN PATENT DOCUMENTS 1079348  4/1960  Fed. Rep. of Germany ............. 73/146
1230245 12/1966  Fed. Rep. of Germany ............. 73/146
1473736  2/1969  Fed. Rep. of Germany ............. 73/146

Primary Examiner—Charles A. Ruehl
Attorney, Agent, or Firm—J. Harold Nissen

[57] ABSTRACT

A measuring wheel for the detection of vertical forces on the wheel when in operation, in which the wheel rim is provided with a plurality of recesses arranged in a circumferential direction adjacent to one another, the recesses being positioned so that webs are formed therebetween which extend transversely through the wheel rim from one side to the other. Detecting elements in the form of wire strain gauges are positioned within the recesses on the webs; these detecting elements are spaced from each other to detect the vertical forces transmitted between the wheel and the rail in the plane of the detecting elements. Additionally, the measuring wheel can be formed with the profile of a rail wheel or a wheel track, and when the measuring wheel has the profile of a wheel track, a separate wheel is used having the profile of a rail wheel.

9 Claims, 3 Drawing Figures

MEASURING WHEEL

The invention relates to a measuring wheel for rail vehicles with detecting elements distributed thereon, particularly wire (resistance) strain gauges, to detect the forces arising on the wheel vertical to the rail when in operation.

Measuring wheel sets, in which wire strain gauges are arranged on the wheel rim or the wheel spokes, or on the axle shaft, have been developed for examining the forces which arise between the wheel and the rail. The slowly changing (approx. 20 Hz–10 KHz) vertical and horizontal forces which are decisive for derailment safety are detected in the contact area of such wheel sets with the rail surface. However, it is possible with these wheel sets to detect forces in the wheel contact area which change more quickly (approx. 20 Hz–10 KHz). In the case of these medium- and high-frequence forces, the vertical forces in particular play an important part with respect to the entire superstructure and the wheel set. This particularly applies to the material stress in the proximity zone of the wheel contact area, i.e. in the rail running surface and the wheel running surface. This stress can lead to cracking in the rail running surface and in the wheel running surface, to flat points in the wheel running surface and to rippling in the rail running surface.

The known processes for detcting the forces arising between the wheel and the rail do not permit an instantaneous contact point of the rail to be exactly localized in the wheel contact area. The instantaneous contact point between the wheel and the rail, however, changes constantly (sine curve) in operation due to the gauge clearance, particularly in an axial direction.

The object of the invention is to provide a measuring wheel which allows the detection of vertical forces between the wheel and the rail in the wheel contact area in the frequency zone of 0 to approx. 10 KHz and provides for the determination of the contact points between the wheel and the rail on the running surface of the wheel in an axial direction.

This object is solved according to the invention with a measuring wheel of the aforementioned type in that several recesses extending transversely to the plane of the wheel are arranged in the wheel rim adjacent to one another in a circumferential direction, said recesses between them forming webs on which the detecting elements are distributed over the width of said wheel rim.

The slow as well as medium speed and quick forces between the wheel and the rail at the contact point can be directly and exactly detected in a vertical direction with the measuring wheel of the invention. This is possible as the detecting elements are now in direct proximity to the introduction of the force on the wheel and consequently no elasticities are present between the point of introduction of the force and the tracer which can have a negative influence on the measuring signal of the detecting elements, particularly with medium and high frequencies. Simultaneously, the exact localization of the point of contact between the wheel and the rail is possible in an axial direction, since the detecting elements are distributed over the width of the wheel rim.

The recesses preferably extend over the entire width of the wheel rim.

It is not necessary for recesses to be arranged with detecting elements over the entire periphery. The recesses are preferably divided into several groups which are distributed over the periphery of the wheel.

The measuring wheel according to the invention can be in the form of a rail wheel, e.g. with a running surface and flange. The usual use of such a measuring wheel is on a rail laid in the track. The forces in the wheel contact area arising between the wheel and the rail are thereby detected directly according to their absolute value and their position at the wheel contact point. However, it is essential for exact measurement that the measuring wheel be calibrated. It is therefore necessary in the examination of several rail wheels of the same type with detecting elements arranged in the wheel rim of the rail wheels to have each single wheel calibrated.

These difficulties can be avoided according to a further embodiment of the invention if the wheel rim of the measuring wheel has at least a rail profile on the running surface and rolls off onto a further wheel having the profile of the rail wheels, the recesses being arranged with detecting elements in the rail head of the wheel having rail profile in the direct proximity of the travelling surface.

As forces arising in the wheel to be examined, generally in the rail wheel, also arise in the wheel having the rail profile, the vertical forces at the wheel contact point and the position of the point of contact between the wheel and the simulated rail can be exactly detected despite indirect measurement with a measuring wheel constructed in this way. As the wheel having the rail profile bears the detecting elements, various rail wheels can be measured on the testing arrangement without calibration being necessary for each wheel; the wheel having the rail profile is calibrated only once. To exclude subsequent calibration to a great extent, a steel with high abrasion resistance can be used as material for the rail profile.

The invention is explained in further detail below by means of a drawing representing an embodiment.

Figure 1:
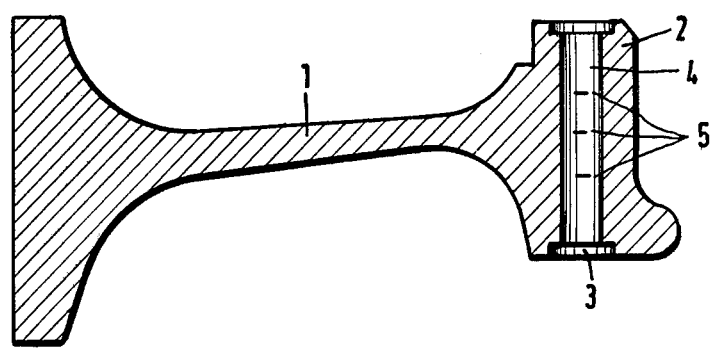
FIG. 1 shows a measuring wheel with a rail wheel profile in semi-axial section.
Figure 2:
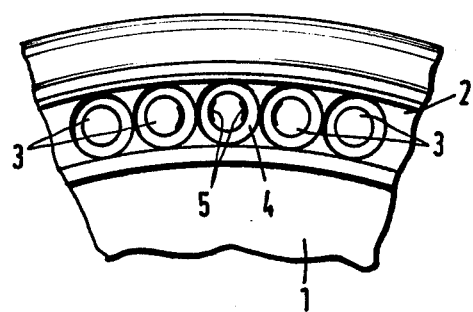
FIG. 2 shows a view of a part of the wheel rim of the measuring wheel according to FIG. 1.

Referring now more particularly to FIGS. 1 and 2 of the accompanying drawings, the rail wheel represented in these figures is a portion of a solid wheel 1 having a solid wheel rim 2. The invention, however, can also be realized and used with other rail wheels; for example, the invention can be used with a rail wheel provided with shrunk wheel tires or with a wheel in which the wheel tire is positioned on the wheel rim over interposed rubber blocks.

Several borings 3 are peripherally spaced along wheel rim 2 and combine to form a group, and each boring together with an adjacent boring forms therebetween a web 4. The web 4, between adjacent borings 3, run transversely through the central axis of the wheel rim 2 and extends from one side of the wheel rim 2 to the other side of the wheel rim 2. Wire resistance strain guages 5 are arranged within the borings, or recesses 3 for measuring grid direction on both sides of the web 4, so that the wire strain gauge 5 responds to the vertical forces on the point of contact. The wire strain gauges 5 are provided in three planes as indicated by the three designations 5 in FIG. 1 placed axially to the wheel axis.

Several such groups of borings can be distributed over the periphery of the wheel.

In view of the structure and arrangement of the measuring point and the arrangement of the wire resistance strain gauges 5 which act as detecting elements in the measuring wheel according to the invention it is possible to measure the vertical forces at the wheel contact point with a high degree of exactitude and also to localize the exact position of contact between the wheel and rail on the running surface of the wheel.

Due to the arrangement of the wire strain gauges it is guaranteed that the height of the measuring signals through the horizontal forces acting on the wheel is negligibly small in relation to the height of the measuring signals through the vertical forces.

Figure 3:
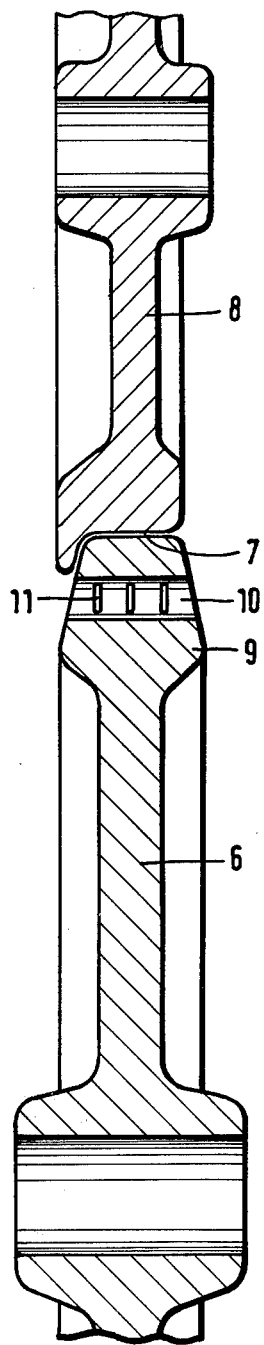
FIG. 3 shows a measuring wheel having the rail profile with a rail wheel having a rail wheel profile both in semi-axial section.

The measuring wheel 6 in the embodiment of FIG. 3 which is pivoted in an unshown frame has a rail profile on its running or travelling surface 7. A rail wheel 8 is also pivoted in the unshown frame which rail wheel 8 is supported on the apex of the measuring wheel 6. At least one wheel, preferably the measuring wheel 6, is actuated. However, both wheels 6, 8 are generally actuated at the same peripheral speed.

Several recesses 10 extending adjacent to one another in a peripheral direction and transversely to the wheel plane are provided in the head 9 of the measuring wheel 6 provided with the rail profile, said recesses 10 forming webs between them on which detecting elements 11 in the form of wire strain gauges are arranged. Three such spaced detecting elements 11 are provided in each recess 10. The structure, arrangement and distribution of the detecting elements 11 coordinate with and are similar to that of FIG. 2.

As is generally known, the wire strain gauges may be connected in a conventional heretofore known manner by unshown conductors with unshown collector rings on the wheel hub which in turn are connected with an unshown measuring means which indicates the forces arising at the individual points.

I claim:

1. In a measuring wheel for rail vehicles, said measuring wheel having detecting elements in the form of wire resistance strain gauges distributed thereon, to detect vertical forces between said wheel and said rail in a constantly changing wheel contact area therebetween on the running surface of said wheel in an axial direction thereof when in operation, the improvement comprising:

said measuring wheel including a wheel rim having a plurality of recesses extending transversely to the plane of the wheel and being arranged adjacent to one another in a circumferential direction;

said recesses being positioned adjacent to each other to combine to form webs therebetween which run transversely through said wheel rim from one side thereof to the other side thereof, and said detecting elements being positioned within said recesses on said webs between the sides of said wheel rim.

2. In the measuring wheel as claimed in claim 1, wherein three of said detecting elements are provided in a plurality of said recesses, and each of said last-mentioned three detecting elements is positioned in a separate plane spaced from each other.

3. In the measuring wheel as claimed in claim 1, wherein said recesses extend over the entire width of said wheel rim, and three of said detecting elements are provided in each said recesses, said detecting elements in each said recess being spaced from each other and being distributed over the width of said wheel rim.

4. In the measuring wheel as claimed in claim 1, wherein said recesses are placed together to form several groups which are distributed over the periphery of said wheel and are in direct proximity to the introduction of the force onto the measuring wheel.

5. In the measuring wheel as claimed in claim 4, wherein said recesses extend over the entire width of said wheel rim, and three spaced detecting elements are provided in each said recesses, each said detecting element is positioned in a plane axially to the wheel axis.

6. In the measuring wheel as claimed in claim 5, wherein said measuring wheel has a profile of a rail wheel.

7. In the measuring device as claimed in claim 5, wherein said measuring wheel has a profile of a rail wheel track.

8. In the measuring wheel as claimed in claim 1 for use with a further wheel having a profile of a rail wheel, wherein said wheel rim includes a head;

said head including a running surface having a rail profile adapted to cooperate with the profile of said rail wheel;

said recesses being arranged directly adjacent to said running surface, and said detecting elements being positioned in said recesses adjacent to said running surface.

9. In the measuring wheel as claimed in claim 8, wherein said recesses extend over the entire width of said wheel rim, and including three spaced detecting elements in said recesses, each positioned in a separate plane axially of the wheel axis.

* * * * *